US010256651B2

(12) United States Patent
Sugimoto et al.

(10) Patent No.: US 10,256,651 B2
(45) Date of Patent: Apr. 9, 2019

(54) BATTERY CHARGING DEVICE AND METHOD OF CONTROLLING BATTERY CHARGING DEVICE

(71) Applicant: SHINDENGEN ELECTRIC MANUFACTURING CO., LTD., Tokyo (JP)

(72) Inventors: Takeaki Sugimoto, Hanno (JP); Yuuta Inoguchi, Hanno (JP)

(73) Assignee: SHINDENGEN ELECTRIC MANUFACTURING CO., LTD., Tokyo (JP)

(*) Notice: Subject to any disclaimer, the term of this patent is extended or adjusted under 35 U.S.C. 154(b) by 7 days.

(21) Appl. No.: 15/100,595

(22) PCT Filed: Mar. 26, 2015

(86) PCT No.: PCT/JP2015/059422
§ 371 (c)(1),
(2) Date: May 31, 2016

(87) PCT Pub. No.: WO2016/151851
PCT Pub. Date: Sep. 29, 2016

(65) Prior Publication Data
US 2018/0006480 A1    Jan. 4, 2018

(51) Int. Cl.
*H02J 7/00* (2006.01)
*H02J 7/14* (2006.01)
(Continued)

(52) U.S. Cl.
CPC ............. *H02J 7/0065* (2013.01); *H02J 7/14* (2013.01); *H02J 7/1446* (2013.01); *H02J 7/242* (2013.01); *H02P 9/04* (2013.01)

(58) Field of Classification Search
USPC ................................................. 320/142, 109
See application file for complete search history.

(56) References Cited

U.S. PATENT DOCUMENTS 6,433,510 B1 * 8/2002 Ribellino .............. H02J 7/0072
320/128
2005/0093520 A1    5/2005 Muramatsu et al.
(Continued)

FOREIGN PATENT DOCUMENTS

EP    2 706 657 A1    3/2014
JP    2002-233072 A    8/2002
(Continued)

OTHER PUBLICATIONS

International Search Report for Application No. PCT/JP2015/059422, dated Jun. 16, 2015 (3 pages).
(Continued)

*Primary Examiner* — Samuel Berhanu
(74) *Attorney, Agent, or Firm* — Nutter McClennen & Fish LLP; Alex Nagorniy

(57) ABSTRACT

A battery charging device includes a conversion part that converts an alternating current output from an alternating-current generator into a direct current by a switching element and supplies the direct current to a battery; a number-of-revolutions acquisition part that acquires a number of revolutions of the alternating-current generator based on a signal responsive to the operation of the alternating-current generator; and an output control part that determines an energization phase angle that defines a timing of energization of the switching element of the conversion part for supplying a charging current from the alternating-current generator to the battery, and controls energization of the switching element based on the energization phase angle.

11 Claims, 8 Drawing Sheets

(51) Int. Cl.
*H02P 9/04* (2006.01)
*H02J 7/24* (2006.01)

(56) References Cited

U.S. PATENT DOCUMENTS

| | | | |
|---|---|---|---|
| 2007/0200531 A1* | 8/2007 | Armiroli | B60K 6/485 318/811 |
| 2008/0067981 A1 | 3/2008 | Inaba et al. | |
| 2009/0160408 A1* | 6/2009 | Suzuki | H02J 7/163 320/164 |
| 2014/0300318 A1* | 10/2014 | Sonoda | B60L 3/0038 320/109 |

FOREIGN PATENT DOCUMENTS

| | | |
|---|---|---|
| JP | 2009-011016 A | 1/2009 |
| JP | 2012-039817 A | 2/2012 |

OTHER PUBLICATIONS

Extended European Search Report for Application No. 15853625.0, dated Nov. 22, 2018 (7 Pages).

\* cited by examiner

| BASIC CHARACTERISTICS ||
|---|---|
| CHARGING CURRENT | ENERGIZATION PHASE ANGLE |
| 0 [A] | 0 [DEGREES] |
| 10 [A] | 15 [DEGREES] |
| 20 [A] | 30 [DEGREES] |
| 30 [A] | 45 [DEGREES] |
| 40 [A] | 60 [DEGREES] |
| 50 [A] | 75 [DEGREES] |
| 55 [A] | 85 [DEGREES] |
| 60 [A] | 90 [DEGREES] |

FIG. 5

| CORRECTION CHARACTERISTICS ||
|---|---|
| NUMBER OF REVOLUTIONS [rpm] | CORRECTION VALUE |
| 1000 | 1 [DEGREES] |
| 2000 | 3 [DEGREES] |
| 3000 | 5 [DEGREES] |
| 4000 | 7 [DEGREES] |
| 5000 | 9 [DEGREES] |
| 6000 | 11 [DEGREES] |
| 7000 | 13 [DEGREES] |
| 8000 | 15 [DEGREES] |
| 9000 | 17 [DEGREES] |
| 10000 | 19 [DEGREES] |

FIG. 6

| NUMBER OF REVOLUTIONS [rpm] | ENERGIZATION PHASE ANGLE IN EMBODIMENT | ENERGIZATION PHASE ANGLE REQUIRED FOR 50A | ACTUAL CHARGING CURRENT |
|---|---|---|---|
| 1000 | 75+1 [DEGREES] | 76 [DEGREES] | 50 [A] |
| 2000 | 75+3 [DEGREES] | 78 [DEGREES] | 50 [A] |
| 3000 | 75+5 [DEGREES] | 80 [DEGREES] | 50 [A] |
| 4000 | 75+7 [DEGREES] | 82 [DEGREES] | 50 [A] |
| 5000 | 75+9 [DEGREES] | 84 [DEGREES] | 50 [A] |
| 6000 | 75+11 [DEGREES] | 86 [DEGREES] | 50 [A] |
| 7000 | 75+13 [DEGREES] | 88 [DEGREES] | 50 [A] |
| 8000 | 75+15 [DEGREES] | 90 [DEGREES] | 50 [A] |
| 9000 | 75+17 [DEGREES] | 92 [DEGREES] | 50 [A] |
| 10000 | 75+19 [DEGREES] | 94 [DEGREES] | 50 [A] |

FIG. 7

| NUMBER OF REVOLUTIONS [rpm] | ENERGIZATION PHASE ANGLE IN PRIOR ART | ENERGIZATION PHASE ANGLE REQUIRED FOR 50A | ACTUAL CHARGING CURRENT |
|---|---|---|---|
| 1000 | 80 [DEGREES] | 76 [DEGREES] | 53 [A] |
| 2000 | 80 [DEGREES] | 78 [DEGREES] | 51 [A] |
| 3000 | 80 [DEGREES] | 80 [DEGREES] | 50 [A] |
| 4000 | 80 [DEGREES] | 82 [DEGREES] | 49 [A] |
| 5000 | 80 [DEGREES] | 84 [DEGREES] | 48 [A] |
| 6000 | 80 [DEGREES] | 86 [DEGREES] | 47 [A] |
| 7000 | 80 [DEGREES] | 88 [DEGREES] | 45 [A] |
| 8000 | 80 [DEGREES] | 90 [DEGREES] | 44 [A] |
| 9000 | 80 [DEGREES] | 92 [DEGREES] | 43 [A] |
| 10000 | 80 [DEGREES] | 94 [DEGREES] | 43 [A] |

FIG. 8

BATTERY CHARGING DEVICE AND METHOD OF CONTROLLING BATTERY CHARGING DEVICE

TECHNICAL FIELD

The present invention relates to a battery charging device and a method of controlling the battery charging device.

BACKGROUND ART

There is a battery charging device for use on a vehicle or the like that charges a battery by converting an alternating current generated by an alternating-current generator operating in association with the engine into a direct current by means of a switching element and applies the direct current to the battery (see Japanese Patent Laid-Open No. 2012-39817, for example).

The conventional battery charging device determines an energization phase angle that defines the timing of energization of the switching element for supplying a charging current from the alternating-current generator to the battery, and controls the energization of the switching element based on the energization phase angle.

In this way, the charging current is supplied from the alternating-current generator to the battery.

SUMMARY OF INVENTION

Technical Problem

With the conventional battery charging device described above, if the number of revolutions of the alternating-current generator changes, the energization phase angle for outputting the desired charging current also changes. For example, if the number of revolutions of the alternating-current generator changes from 1000 rpm to 10000 rpm, the energization phase angle for outputting a charging current of 50 A also changes from 76° to 94° (FIG. 8).

However, with the conventional battery charging device, the energization phase angle is fixed even if the number of revolutions of the alternating-current generator changes. For example, even if the number of revolutions of the alternating-current generator changes from 1000 rpm to 10000 rpm, the energization phase angle is fixed at 80° (FIG. 8).

Thus, the conventional battery charging device has a problem in that the battery charging device cannot supply the predetermined charging current to the battery and cannot provide the desired battery voltage, since the energization phase angle is not changed even if the number of revolutions of the alternating-current generator changes.

In view of such circumstances, an object of the present invention is to provide a battery charging device that can supply a desired charging current to a battery and more appropriately control the battery voltage to be a desired voltage.

Solution to Problem

A battery charging device according to an embodiment of an aspect of the present invention, comprising:

a conversion part that converts an alternating current output from an alternating-current generator into a direct current by a switching element and supplies the direct current to a battery;

a number-of-revolutions acquisition part that acquires a number of revolutions of the alternating-current generator based on a signal responsive to the operation of the alternating-current generator; and an output control part that determines an energization phase angle that defines a timing of energization of the switching element of the conversion part for supplying a charging current from the alternating-current generator to the battery, and controls energization of the switching element based on the energization phase angle, wherein the output control part
has a table that defines a relationship between the charging current of the battery and the energization phase angle and a relationship between the number of revolutions of the alternating-current generator and a correction value with which the energization phase angle is corrected in response to the number of revolutions, and the output control part
acquires the energization phase angle and the correction value by referring to the table for the charging current to be output and the number of revolutions acquired by the number-of-revolutions acquisition part, and corrects the energization phase angle with the correction value.

In the battery charging device, wherein the output control part
corrects the energization phase angle by adding the correction value to the energization phase angle defined in the table.

In the battery charging device, wherein, in the table, the correction value is defined to increase as the number of revolutions of the alternating-current generator increases.

In the battery charging device, wherein the battery charging device further comprises:
a temperature sensor that detects a temperature of an inside or outside of the battery charging device,
the table further defines a relationship between the correction value and the temperature detected by the temperature sensor, and
the output control part
acquires the correction value by referring to the table for the number of revolutions acquired by the number-of-revolutions acquisition part and the temperature detected by the temperature sensor.

In the battery charging device, wherein the table further defines a relationship between the correction value and a load current flowing to a load circuit connected to the battery, and
the output control part
acquires the correction value by referring to the table for the number of revolutions acquired by the number-of-revolutions acquisition part and the load current.

In the battery charging device, wherein the number-of-revolutions acquisition part acquires the number of revolutions of the alternating-current generator based on a pulser signal induced in a pulser coil when the alternating-current generator is operating.

In the battery charging device, wherein the battery charging device further comprises:
a phase detection part that detects a phase of an alternating-current voltage output by the alternating-current generator, and
the output control part determines the energization phase angle for the phase detected by the phase detection part.

In the battery charging device, wherein the phase detection part
detects the phase of the alternating-current voltage based on a comparison result signal responsive to a result of comparison between the alternating-current voltage output from the alternating-current generator and a threshold voltage.

In the battery charging device, wherein the battery charging device further comprises:

a zero cross signal generation circuit that outputs the comparison result signal based on the result of comparison between the alternating-current voltage output from the alternating-current generator and the threshold.

In the battery charging device, wherein the output control part controls a phase of the switching element based on the energization phase angle corrected with the correction value.

A method of controlling a battery charging device according to an embodiment, which is an aspect of the present invention, is a method of controlling a battery charging device that includes: a conversion part that converts an alternating current output from an alternating-current generator into a direct current by a switching element and supplies the direct current to a battery; a number-of-revolutions acquisition part that acquires a number of revolutions of the alternating-current generator based on a signal responsive to the operation of the alternating-current generator; and an output control part that determines an energization phase angle that defines a timing of energization of the switching element of the conversion part for supplying a charging current from the alternating-current generator to the battery and controls energization of the switching element based on the energization phase angle, the output control part having a table that defines a relationship between the charging current of the battery and the energization phase angle and a relationship between the number of revolutions of the alternating-current generator and a correction value with which the energization phase angle is corrected in response to the number of revolutions, and the output control part acquires the energization phase angle and the correction value by referring to the table for the charging current to be output and the number of revolutions acquired by the number-of-revolutions acquisition part, and corrects the energization phase angle with the correction value.

A battery charging device according to an aspect of the present invention includes: a conversion part that converts an alternating current output from an alternating-current generator into a direct current by a switching element and supplies the direct current to a battery; a number-of-revolutions acquisition part that acquires a number of revolutions of the alternating-current generator based on a signal responsive to the operation of the alternating-current generator; and an output control part that determines an energization phase angle that defines a timing of energization of the switching element of the conversion part for supplying a charging current from the alternating-current generator to the battery, and controls energization of the switching element based on the energization phase angle.

The output control part has a table that defines a relationship between the charging current of the battery and the energization phase angle and a relationship between the number of revolutions of the alternating-current generator and a correction value with which the energization phase angle is corrected in response to the number of revolutions. The output control part acquires the energization phase angle and the correction value by referring to the table for the charging current to be output and the number-of-revolutions acquisition part, and corrects the energization phase angle with the correction value.

In this way, the energization phase angle that defines the timing of energization of the switching element is corrected in response to the number of revolutions of the alternating-current generator.

Even if the number of revolutions of the alternating-current generator changes, the battery charging device according to the present invention can supply a predetermined charging current from the alternating-current generator to the battery by correcting the energization phase angle that defines the timing of energization of the switching element in response to the number of revolutions of the alternating-current generator.

That is, the battery charging device according to the present invention can more appropriately control the battery voltage to be a desired voltage by supplying the predetermined charging current to the battery.

BRIEF DESCRIPTION OF THE DRAWINGS

FIG. 5 is a diagram showing an example of basic characteristics that is a relationship between a charging current and the energization phase angle defined in a table "Y" in an output control part "X" shown in FIG. 1.

FIG. 6 is a diagram showing an example of correction characteristics that is a relationship between the number of revolutions of an alternating-current generator "M" and a correction value for the energization phase angle defined in the table "Y" in the output control part "X" shown in FIG. 1.

FIG. 7 is a diagram showing an example of a relationship between the number of revolutions of the alternating-current generator "M", the energization phase angle corrected in response to the number of revolutions of the alternating-current generator "M" and the charging current in a battery charging device 100.

FIG. 8 is a diagram showing an example of a relationship between the number of revolutions of the alternating-current generator, the energization phase angle and the charging current in conventional battery charging.

DESCRIPTION OF EMBODIMENTS

In the following, an embodiment of the present invention will be described with reference to the drawings.

First Embodiment

Figure 1:
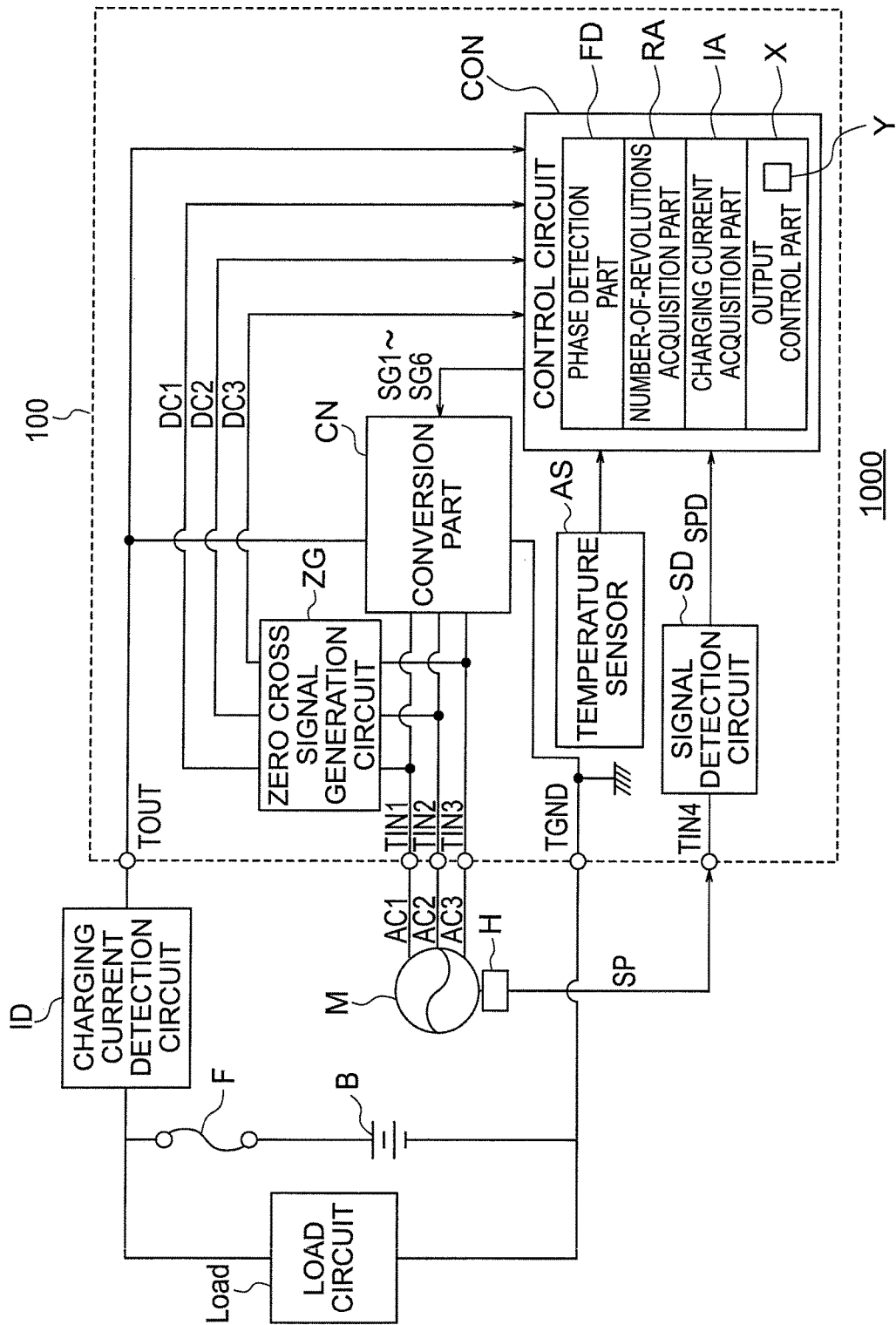
FIG. 1 is a diagram showing an example of a configuration of a battery charging system 1000 including a battery charging device 100 according to an embodiment of the present invention.

A battery charging system 1000 includes an alternating-current generator "M", a battery "B", a battery charging device 100 that converts an alternating current output from the alternating-current generator "M" into a direct current and supplies the direct current to the battery "B", a charging current detection circuit "ID" that detects a charging current output from the battery charging device 100, a fuse "F" that prevents an overcurrent from flowing to the battery "B", and a load circuit "Load" connected in parallel with the battery "B" (FIG. 1).

The fuse "F" is connected in series with the battery "B" between an output terminal "TOUT" of the battery charging device 100 and a ground terminal "TGND".

The load circuit "Load" is connected in parallel with the battery "B" between the output terminal "TOUT" and the ground terminal "TGND". The charging current output from the battery charging device 100 is supplied to the load circuit "Load" and the battery "B".

U-phase, V-phase and W-phase output parts of the alternating-current generator "M" are connected to input terminals "TIN1", "TIN2" and "TIN3" of the battery charging device 100, respectively. Alternating-current voltages "AC1", "AC2" and ac3 are supplied to the input terminals "TIN1", "TIN2" and "TIN3" of the battery charging device 100, respectively.

The alternating-current generator "M" generates alternating-current power by operating in association with an engine of a vehicle or the like, for example. The alternating-current generator "M" outputs the generated alternating-current power to the battery charging device 100. In the example shown in FIG. 1, the alternating-current generator "M" is a three-phase alternating-current generator.

A pulser coil "H" is attached to a stator side of the alternating-current generator "M", for example.

The pulser coil "H" is a coil with an iron core (not shown) having a magnetic pole part. A plurality of reluctors are attached to a rotor side of the alternating-current generator "M", for example. For example, three reluctors are attached to an outer periphery of a rotor of the alternating-current generator "M" at intervals of 120°.

The pulser coil "H" outputs a pulser signal "SP" as the reluctors pass in the vicinity of the magnetic pole part of the iron core of the pulser coil "H" when the alternating-current generator "M" is operating, for example. In other words, the pulser coil "H" generates a pulser signal "SP" that represents the number of revolutions (rpm) of the rotor while the rotor of the alternating-current generator "M" is revolving. The generated pulser signal "SP" is output to a pulse input terminal "TIN4" of the battery charging device 100.

A positive electrode of the battery "B" is connected to the output terminal "TOUT" of the battery charging device 100 via the fuse "F". A negative electrode of the battery "B" is connected to the ground terminal "TGND" of the battery charging device 100. For example, the negative electrode of the battery "B" is grounded via the body of the vehicle on which the battery charging device 100 is mounted (that is, the negative electrode is connected to the ground terminal "TGND").

As described above, the battery charging device 100 converts the alternating current output from the alternating-current generator "M" into a direct current and supplies the direct current to the battery "B" (FIG. 1).

The battery charging device 100 includes a conversion part (conversion circuit) "CN" that converts an alternating current output from the alternating-current generator "M" into a direct current and supplies the direct current to the battery "B" and a zero cross signal generation circuit "ZG" that outputs comparison result signals "DC1" to "DC3" based on the result of comparison between the alternating-current voltages "AC1" to "AC3" output from the alternating-current generator "M" and a threshold voltage.

Figure 2:
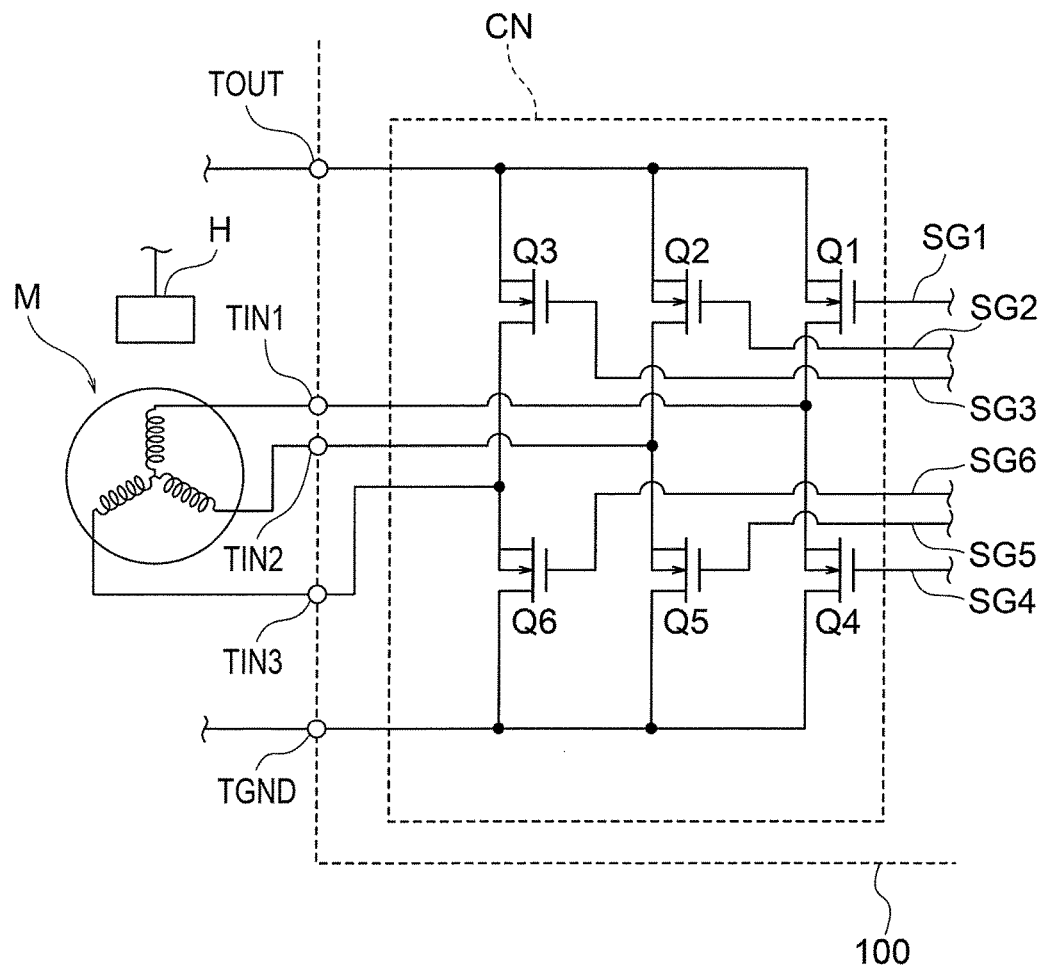
FIG. 2 is a circuit diagram showing an example of a configuration of a conversion part "CN" shown in FIG. 1.

The conversion part "CN" is formed by a three-phase bridge rectifier circuit including switching elements "Q1" to "Q6" (FIG. 2). The conversion part "CN" converts the alternating current output from the alternating-current generator "M" into a direct current by means of the switching elements "Q1" to "Q6" and supplies the direct current to the battery "B".

The switching elements "Q1" to "Q6" are field effect transistors (FETs), for example (FIG. 2).

For example, the switching element "Q1" is connected between the output terminal "TOUT" and the U-phase output of the alternating-current generator "M". The switching element "Q2" is connected between the output terminal "TOUT" and the V-phase output of the alternating-current generator "M". The switching element q3 is connected between the output terminal "TOUT" and the W-phase output of the alternating-current generator "M".

The switching element "Q4" is connected between the U-phase output of the alternating-current generator "M" and the ground terminal "TGND". The switching element "Q5" is connected between the V-phase output of the alternating-current generator "M" and the ground terminal "TGND". The switching element "Q6" is connected between the W-phase output of the alternating-current generator "M" and the ground terminal "TGND".

The switching elements "Q1" to "Q6" are switched by gate signals "SG1" to "SG6" output from the control circuit "CON".

In short, the conversion part "CN" converts the alternating current output from the alternating-current generator "M" into a direct current by turning on and off the switching elements "Q1" to "Q6" in response to the gate signals "SG1" to "SG6" output from the control circuit "CON", respectively. In this way, the charging current supplied to the battery "B" and the load circuit "Load" is controlled via the output terminal "TOUT".

In other words, the battery charging device 100 charges the battery "B" by converting the alternating-current power output from the alternating-current generator "M" into a direct-current power by means of the switching elements "Q1" to "Q6" and supplying the direct-current power to the battery "B".

In this embodiment, the battery charging device 100 controls the charged state (or discharged state) of the battery "B" by performing a phase lag control that lags the timing of the switching operation (the timing of energization) of the switching elements "Q1" to "Q6" with respect to the alternating-current output of the alternating-current generator "M" or a phase advance control that advances the timing of the switching operation of the switching elements "Q1" to "Q6" with respect to the alternating-current output of the alternating-current generator "M".

The zero cross signal generation circuit "ZG" is connected to the input terminals "TIN1" to "TIN3" and the control circuit "CON". As described above, the zero cross signal generation circuit "ZG" outputs the comparison result signals "DC1" to "DC3" based on the result of comparison between the alternating-current voltages "AC1" to "AC3" output from the alternating-current generator "M" and the threshold voltage.

For example, if the alternating-current voltage "AC1" ("AC2" or "AC3") is equal to or higher than the predetermined threshold voltage, the zero cross signal generation circuit "ZG" outputs the comparison result signal "DC1" ("DC2" or "DC3") at a "High" level "VH".

On the other hand, if the alternating-current voltage "AC1" ("AC2" or "AC3") is lower than the predetermined threshold voltage, the zero cross signal generation circuit "ZG" outputs the comparison result signal "DC1" ("DC2" or "DC3") at a "Low" level "VL", which is lower than the "High" level "VH".

As the threshold voltage, a value close to the ground voltage (0V) is chosen, for example. In this case, if the alternating-current voltage "AC1" ("AC2" or "AC3") assumes a positive value, the comparison result signal "DC1" ("DC2" or "DC3") is at the "High" level "VH". On the other hand, if the alternating-current voltage "AC1" ("AC2" or "AC3") assumes a negative value, the comparison result signal "DC1" ("DC2" or "DC3") is at the "Low" level "VL".

A signal detection circuit "SD" detects the pulser signal "SP" that is induced in the pulser coil "H" when the alternating-current generator "M" is operating and input thereto via the input terminal "TIN4", and generates a pulse signal "SPD" that is synchronized with the operation of the alternating-current generator "M". The signal detection circuit "SD" outputs the generated pulser signal "SPD" to the control circuit "CON".

The battery charging device 100 includes the control circuit "CON" that controls the conversion part "CN" based on the comparison result signals "DC1" to "DC3".

The control circuit "CON" includes a phase detection part (phase detection circuit) "FD", a number-of-revolutions acquisition part (number-of-revolutions acquisition circuit) "RA", an output control part (output control circuit) "X" and a charging current acquisition part (charging current acquisition circuit) "IA", for example (FIG. 1).

The phase detection part "FD" detects the phase of the alternating-current voltages "AC1" to "AC3" output from the alternating-current generator "M".

The phase detection part "FD" detects the phase of the alternating-current voltages "AC1" to "AC3" based on the comparison result signals "DC1" to "DC3", for example. As described above, the comparison result signals "DC1" to "DC3" are signals responsive to the result of comparison between the alternating-current voltages "AC1" to "AC3" output from the alternating-current generator "M" and the threshold voltage.

As described above, as the threshold voltage, a value close to the ground voltage (0V) is chosen.

In this case, if the alternating-current voltage "AC1" ("AC2" or "AC3") assumes a positive value, the comparison result signal "DC1" ("DC2" or "DC3") is at the "High" level "VH".

The phase detection part "FD" detects the phase at which the alternating-current voltage "AC1" ("AC2" or "AC3") changes from negative to positive at the timing when the comparison result signal "DC1" ("DC2" or "DC3") changes to the "High" level.

On the other hand, if the alternating-current voltage "AC1" ("AC2" or "AC3") assumes a negative value, the comparison result signal "DC1" ("DC2" or "DC3") is at the "Low" level "VL".

The phase detection part "FD" detects the phase at which the alternating-current voltage "AC1" ("AC2" or "AC3") changes from positive to negative at the timing when the comparison result signal "DC1" ("DC2" or "DC3") changes to the "Low" level.

In this way, the phase detection part "FD" detects the phase of the alternating-current voltages "AC1" to "AC3" output from the alternating-current generator "M".

The number-of-revolutions acquisition part "RA" acquires the number of revolutions of the alternating-current generator "M" based on a signal responsive to the operation of the alternating-current generator "M".

For example, the number-of-revolutions acquisition part "RA" acquires the number of revolutions of the alternating-current generator "M" based on the pulser signal "SP" (pulse signal "SPD" output from the signal detection circuit "SD") induced in the pulser coil "H" when the alternating-current generator "M" is operating.

In this embodiment, the number-of-revolutions acquisition part "RA" acquires the number of revolutions (rpm) of the alternating-current generator "M" by counting the pulser signals "SPD" generated by the signal detection circuit "SD" per unit time, for example.

The number-of-revolutions acquisition part "RA" outputs the acquired number of revolutions of the alternating-current generator "M" to the output control part "X".

The number-of-revolutions acquisition part "RA" is not limited to the configuration that acquires the number of revolutions of the alternating-current generator "M" based on the pulser signal "SP" (pulser signal "SPD" output from the signal detection circuit "SD") output from the pulser coil "H", and can have any configuration capable of acquiring at least the number of revolutions of the alternating-current generator "M".

For example, a Hall IC may be provided in the alternating-current generator "M". In this case, the number-of-revolutions acquisition part "RA" acquires the number of revolutions of the alternating-current generator "M" based on a signal output from the Hall IC provided.

Alternatively, the number-of-revolutions acquisition part "RA" may acquire the number of revolutions of the alternating-current generator "M" based on a signal indicating the number of revolutions supplied from a higher-level engine control unit (ECU).

The output control part "X" determines an energization phase angle for the phase of the alternating-current voltages "AC1" to "AC3" detected by the phase detection part "FD". The energization phase angle that defines the timing of energization of the switching elements "Q1" to "Q6" in the conversion part "CN" for supplying the charging current from the alternating-current generator "M" to the battery "B". Furthermore, the output control part "X" controls energization of the switching elements "Q1" to "Q6" based on the determined energization phase angle. As described later, the determined energization phase angle is corrected in response to the number of revolutions of the alternating-current generator "M".

Figure 3:
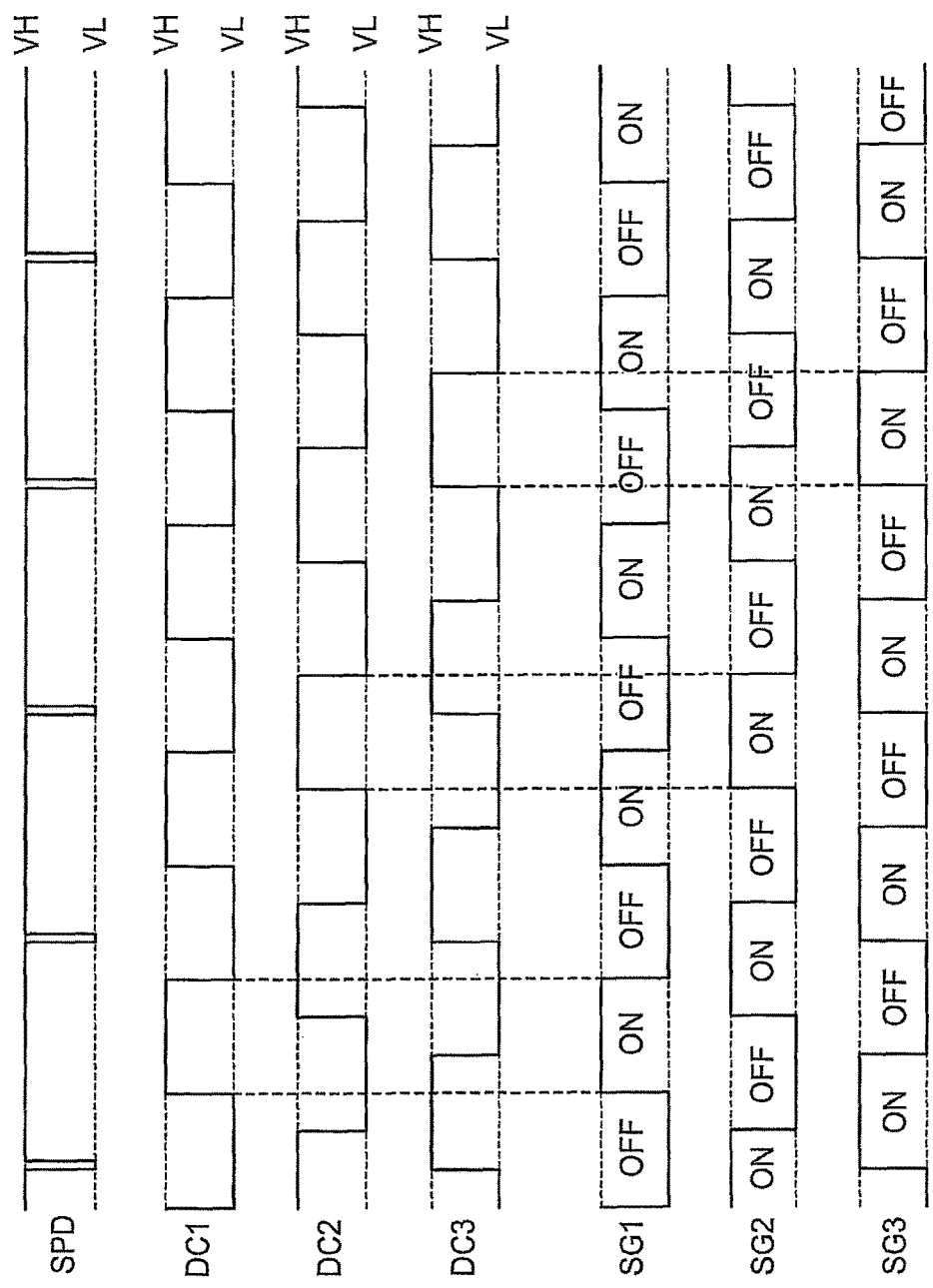
FIG. 3 is a timing chart showing an example of switching operations of switching elements "Q1" to "Q3".

In the following, the timing of energization (energization phase angle) for switching of the switching elements "Q1" to "Q3" will be described with reference to FIGS. 3 and 4. FIG. 3 shows an example in which the switching elements "Q1" to "Q3" are kept in an energized (on) state for a period equivalent to a phase angle of 180°, and the on duty of the gate signals "SG1" to "SG3" is fixed at 50%.

FIG. 3 illustrates switching operations of the switching elements "Q1" to "Q3", as an example. Switching operations of the switching elements "Q4" to "Q6" occur as follows: the switching element "Q1" and the switching element "Q4" are turned on and off in a complementary manner, the switching element "Q2" and the switching element "Q5" are turned on and off in a complementary manner, and the switching element "Q3" and the switching element "Q6" are turned on and off in a complementary manner.

In the example shown in FIG. 3, the pulser signal "SPD" has a waveform that falls at a time when the phase of the alternating-current voltage "AC3" of the alternating-current generator "M" becomes 0° (when the comparison result signal "DC3" rises). The gate signals "SG1" to "SG3"

applied to the gate of the switching elements "Q1" to "Q3" have a pulse width equivalent to a half the period (a phase angle of 180°) of the alternating-current voltages "AC1" to "AC3".

For example, the energization phase angle is defined as the timings when the gate signals "SG1" to "SG3" applied to the gate of the switching elements "Q1" to "Q3" rise (when the gate signals are turned on) with respect to a phase of 90° from the phase at which the alternating-current voltages "AC1" to "AC3" of the alternating-current generator "M" rise. However, the present invention is not limited to this example, and the reference with respect to which the energization phase angle is defined can be any phase of the alternating-current voltages "AC1" to "AC3" of the alternating-current generator "M". That is, the energization phase angle defines at least a relative relationship between the phase of the alternating-current voltages "AC1" to "AC3" of the alternating-current generator "M" and the phase of the gate signals "SG1" to "SG3" applied to the gate of the switching elements "Q1" to "Q3".

In FIG. 3, for example, the switching element "Q1" is energized and turned on at the time when the comparison result signal "DC1" rises from the "Low" level "VL" to the "High" level "VH" (in other words, the time when the alternating-current voltage "AC1" becomes equal to or higher than the predetermined threshold voltage).

The switching element "Q1" is turned off at the time when the comparison result signal "DC1" falls from the "High" level "VH" to the "Low" level "VL" (in other words, the time when the alternating-current voltage "AC1" becomes lower than the threshold voltage).

That is, in FIG. 3, the energization phase angle for the phase of the alternating-current voltage "AC1" is set so that the switching element "Q1" is energized at the time when the alternating-current voltage "AC1" becomes equal to or higher than the threshold voltage.

The switching elements "Q2" and "Q3" are turned on and off according to the comparison result signals "DC2" and "DC3", respectively, as with the switching element "Q1". That is, the switching elements "Q2" and "Q3" are turned on and off based on the energization phase angle for the phase of the alternating-current voltages "AC2" and "AC3" detected by the phase detection part "FD", respectively.

As described above, the switching elements "Q4" to "Q6" are turned on and off in such a manner that the switching element "Q1" and the switching element "Q4" are turned on and off in a complementary manner, the switching element "Q2" and the switching element "Q5" are turned on and off in a complementary manner, and the switching element "Q3" and the switching element "Q6" are turned on and off in a complementary manner.

Figure 4:
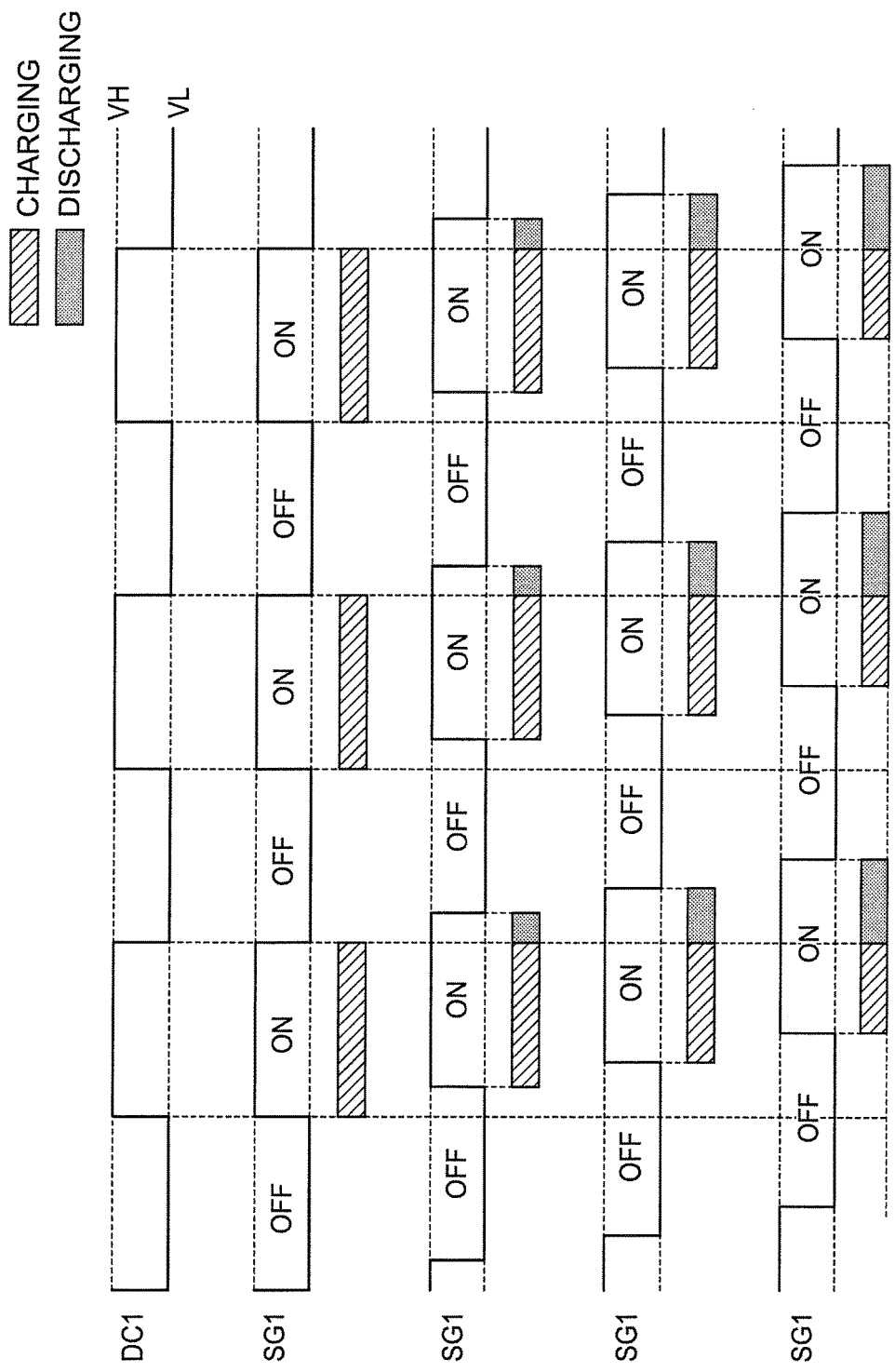
FIG. 4 is a timing chart showing an example of an operation of the switching element "Q1" in a case where an energization phase angle is changed.

As shown in FIG. 4, even if the switching frequency of the switching element "Q1" is fixed, the duration for which the battery "B" is charged changes depending on the relationship between the duration for which the switching element "Q1" is in the on state (the duration for which the switching element "Q1" is energized) and the duration for which the comparison result signal "DC1" is at the "High" level "VH".

In other words, the duration for which the battery "B" is charged changes in response to the energization phase angle for the phase of the alternating-current voltage "AC1" (comparison result signal "DC1" (that is, the timing of energization of the switching element "Q1"). As a result, the ratio of the U-phase output power supplied from the alternating-current generator "M" to the battery "B" changes, and the charging current output at the output terminal "TOUT" also changes.

In this way, by controlling the timing of energization (energization phase angle) of the switching elements "Q1" to "Q6", the charging current supplied to the battery "B" can be controlled, and charging of the battery "B" can be controlled.

As described above, the battery charging device 100 controls the value of the charging current by controlling the energization phase angle of the gate signals "SG1" to "SG6" that defines the timing of switching (energization) of the switching elements "Q1" to "Q6" for the alternating-current voltages "AC1", "AC2" and "AC3" output from the alternating-current generator "M".

The output control part "X" has a table "Y" (FIG. 1). The table "Y" defines the characteristics shown in FIGS. 5 and 6, for example.

For example, the table "Y" defines a relationship between the charging current of the battery "B" and the energization phase angle (basic characteristics shown in FIG. 5). For example, the energization phase angle is set at 75° for a charging current of 50 A.

In addition, the table "Y" defines a relationship between the number of revolutions of the alternating-current generator "M" and a correction value for the energization phase angle responsive to the number of revolutions (correction characteristics shown in FIG. 6). In the table "Y", the correction value is set to increase as the number of revolutions of the alternating-current generator "M" increases (FIG. 6).

The output control part "X" acquires the energization phase angle and the correction value by referring to the table "Y" for the charging current to be output and the number of revolutions acquired by the number-of-revolutions acquisition part "RA", and corrects the energization phase angle with the correction value.

For example, the output control part "X" corrects the energization phase angle by adding the correction value to the energization phase angle defined in the table "Y".

The output control part "X" controls the phase of the switching elements "Q1" to "Q6" based on the energization phase angle corrected with the correction value.

The battery charging device 100 may further include a temperature sensor "AS" that detects the temperature of the inside or outside of the battery charging device 100 (FIG. 1). In the example shown in FIG. 1, the temperature sensor "AS" is configured to detect the temperature of the inside of the battery charging device 100.

In this case, the table "Y" may further define a relationship between the correction value and the temperature detected by the temperature sensor "AS", for example.

The output control part "X" may acquire the correction value of the energization phase angle by referring to the table "Y" for the number of revolutions acquired by the number-of-revolutions acquisition part "RA" and the temperature detected by the temperature sensor "AS".

In this case also, the output control part "X" controls the phase of the switching elements "Q1" to "Q6" based on the energization phase angle corrected with the correction value.

The table "Y" may further define a relationship between the correction value and a load current flowing to the load circuit "Load" connected to the battery "B". In this case, the battery charging system 1000 further includes a detection circuit (not shown) that detects the load current.

The output control part "X" may be further configured to acquire the correction value for the energization phase angle by referring to the table "Y" for the number of revolutions acquired by the number-of-revolutions acquisition part "RA" and the load current. In this case also, the output control part "X" controls the phase of the switching elements "Q1" to "Q6" based on the energization phase angle corrected with the correction value.

Next, an example of a method of controlling the battery charging device 100 configured as described above will be described.

For example, the phase detection part "FD" of the battery charging device 100 detects the phase of the alternating voltages "AC1" to "AC3" based on the comparison result signals "DC1" to "DC3".

Furthermore, the number-of-revolutions acquisition part "RA" of the battery charging device 100 acquires the number of revolutions of the alternating-current generator "M" based on the pulser signal "SPD" output from the signal detection circuit "SD".

The output control part "X" of the battery charging device 100 determines the energization phase angle for the phase of the alternating-current voltages "AC1" to "AC3" detected by the phase detection part "FD" (FIG. 5).

Furthermore, the output control part "X" acquires the energization phase angle and the correction value by referring to the table "Y" for the charging current to be output and the number of revolutions acquired by the number-of-revolutions acquisition part "RA", and corrects the energization phase angle with the correction value. That is, the energization phase angle that defines the timing of energization of the switching elements is corrected in response to the number of revolutions of the alternating-current generator.

The output control part "X" then controls the phase of the switching elements "Q1" to "Q6" based on the energization phase angle corrected with the correction value. If the number of revolutions of the alternating-current generator "M" changes, the correction value also changes, and therefore, the switching elements "Q1" to "Q6" are controlled with the energization phase angle corrected with the correction value for the changed number of revolutions.

In this way, the battery charging device 100 according to the present invention can supply a predetermined charging current to the battery and more appropriately controls the battery voltage to be a desired voltage by controlling the phase of the switching elements "Q1" to "Q6" based on the energization phase angle corrected with the correction value.

As described above, the battery charging device 100 includes a conversion part that converts an alternating current output from an alternating-current generator into a direct current by a switching element and supplies the direct current to a battery, a number-of-revolutions acquisition part "RA" that acquires the number of revolutions of the alternating-current generator based on a signal responsive to the operation of the alternating-current generator, and an output control part "X" that determines an energization phase angle that defines the timing of energization of a switching element in the conversion part "CN" for supplying a charging current from the alternating-current generator to the battery and controls energization of the switching element based on the energization phase angle.

The output control part "X" has a table "Y" that defines a relationship between the charging current of the battery and the energization phase angle and a relationship between the number of revolutions of the alternating-current generator and a correction value for the energization phase angle that is responsive to the number of revolutions. The output control part "X" acquires the energization phase angle and the correction value by referring to the table "Y" for the charging current to be output and the number of revolutions acquired by the number-of-revolutions acquisition part "RA", and corrects the energization phase angle with the correction value.

In this way, the energization phase angle that defines the timing of energization of the switching element is corrected in response to the number of revolutions of the alternating-current generator.

As described above, even if the number of revolutions of an alternating-current generator changes, the battery charging device according to the present invention can supply a predetermined charging current from the alternating-current generator to a battery by correcting an energization phase angle that defines the timing of energization of a switching element in response to the number of revolutions of the alternating-current generator (FIG. 5).

That is, the battery charging device according to the present invention can more appropriately control the battery voltage to be a desired voltage by supplying the predetermined charging current to the battery.

Although embodiments of the present invention have been described, the embodiments are shown for illustrative purposes only and are not intended to limit the scope of the present invention. The embodiments can be implemented in other various forms, and various omissions, replacements or modifications are possible without departing from the spirit of the present invention. The embodiments and modifications thereof are included in the scope and spirit of the present invention and are included in the scope of the present invention set forth in the claims and equivalents thereof.

The invention claimed is:

1. A battery charging device, comprising:
a conversion part that converts an alternating current output from an alternating-current generator into a direct current by a switching element and supplies the direct current to a battery;
a number-of-revolutions acquisition part that acquires a number of revolutions of the alternating-current generator based on a signal responsive to the operation of the alternating-current generator; and
an output control part that determines an energization phase angle that defines a timing of energization of the switching element of the conversion part for supplying a charging current from the alternating-current generator to the battery, and controls energization of the switching element based on the energization phase angle,
wherein the output control part
has a table that defines a relationship between the charging current of the battery and the energization phase angle and a relationship between the number of revolutions of the alternating-current generator and a correction value with which the energization phase angle is corrected in response to the number of revolutions, and
the output control part
acquires the energization phase angle and the correction value by referring to the table for the charging current to be output and the number of revolutions acquired by the number-of-revolutions acquisition part, and corrects the energization phase angle with the correction value.

2. The battery charging device according to claim 1, wherein the output control part
corrects the energization phase angle by adding the correction value to the energization phase angle defined in the table.

3. The battery charging device according to claim 1, wherein, in the table, the correction value is defined to increase as the number of revolutions of the alternating-current generator increases.

4. The battery charging device according to claim 1, wherein the battery charging device further comprises:
a temperature sensor that detects a temperature of an inside or outside of the battery charging device,
the table further defines a relationship between the correction value and the temperature detected by the temperature sensor, and
the output control part
acquires the correction value by referring to the table for the number of revolutions acquired by the number-of-revolutions acquisition part and the temperature detected by the temperature sensor.

5. The battery charging device according to claim 1, wherein the table further defines a relationship between the correction value and a load current flowing to a load circuit connected to the battery, and
the output control part
acquires the correction value by referring to the table for the number of revolutions acquired by the number-of-revolutions acquisition part and the load current.

6. The battery charging device according to claim 1, wherein the number-of-revolutions acquisition part acquires the number of revolutions of the alternating-current generator based on a pulser signal induced in a pulser coil when the alternating-current generator is operating.

7. The battery charging device according to claim 1, wherein the battery charging device further comprises:
a phase detection part that detects a phase of an alternating-current voltage output by the alternating-current generator, and
the output control part determines the energization phase angle for the phase detected by the phase detection part.

8. The battery charging device according to claim 7, wherein the phase detection part
detects the phase of the alternating-current voltage based on a comparison result signal responsive to a result of comparison between the alternating-current voltage output from the alternating-current generator and a threshold voltage.

9. The battery charging device according to claim 8, wherein the battery charging device further comprises:
a zero cross signal generation circuit that outputs the comparison result signal based on the result of comparison between the alternating-current voltage output from the alternating-current generator and the threshold.

10. The battery charging device according to claim 1, wherein the output control part
controls a phase of the switching element based on the energization phase angle corrected with the correction value.

11. A method of controlling a battery charging device that comprises: a conversion part that converts an alternating current output from an alternating-current generator into a direct current by a switching element and supplies the direct current to a battery; a number-of-revolutions acquisition part that acquires a number of revolutions of the alternating-current generator based on a signal responsive to the operation of the alternating-current generator; and an output control part that determines an energization phase angle that defines a timing of energization of the switching element of the conversion part for supplying a charging current from the alternating-current generator to the battery and controls energization of the switching element based on the energization phase angle, the output control part having a table that defines a relationship between the charging current of the battery and the energization phase angle and a relationship between the number of revolutions of the alternating-current generator and a correction value with which the energization phase angle is corrected in response to the number of revolutions,
wherein the output control part acquires the energization phase angle and the correction value by referring to the table for the charging current to be output and the number of revolutions acquired by the number-of-revolutions acquisition part, and corrects the energization phase angle with the correction value.

* * * * *